(12) United States Patent
Kapczynski et al.

(10) Patent No.: US 6,938,876 B2
(45) Date of Patent: Sep. 6, 2005

(54) BALL VALVE WITH RETRACTABLE SEALS AND METHOD OF REPLACEMENT THEREOF

(75) Inventors: Przemyslaw Kapczynski, Poznan (PL); Stanislaw Kaluza, Rawicz (PL)

(73) Assignee: Zaklad Urzadzen Gazowniczych "Gazomet", Rawicz (PL)

( * ) Notice: Subject to any disclaimer, the term of this patent is extended or adjusted under 35 U.S.C. 154(b) by 77 days.

(21) Appl. No.: 10/415,460

(22) PCT Filed: Jul. 2, 2001

(86) PCT No.: PCT/PL01/00057
§ 371 (c)(1),
(2), (4) Date: Apr. 29, 2003

(87) PCT Pub. No.: WO02/086366
PCT Pub. Date: Oct. 31, 2002

(65) Prior Publication Data
US 2004/0020536 A1 Feb. 5, 2004

(30) Foreign Application Priority Data
Apr. 23, 2001 (PL) .................................. 347255

(51) Int. Cl.$^7$ .............................................. F16K 25/00
(52) U.S. Cl. .................. 251/161; 251/174; 251/315.12; 137/315.21
(58) Field of Search ................................. 251/159, 160, 251/161, 192, 315.12, 316, 360, 363; 137/15.22, 315.21

(56) References Cited

U.S. PATENT DOCUMENTS

| 3,195,560 | A | * | 7/1965 | Pofit | 137/315.21 |
| 3,580,539 | A | * | 5/1971 | Van Scoy | 251/159 |
| 4,273,152 | A | | 6/1981 | Freeman | |

FOREIGN PATENT DOCUMENTS

GB  2 213 564  8/1989

* cited by examiner

Primary Examiner—Edward K. Look
Assistant Examiner—John K. Fristoe, Jr.
(74) Attorney, Agent, or Firm—Jordan and Hamburg LLP

(57) ABSTRACT

A ball value has a valve body defining a cavity, a ball closing component disposed within the cavity through a cavity opening, a cover, and seal assemblies having seating rings with seals disposed engaging both sides of the ball closing component. The seating rings slide in recesses of the valve body into and out of engagement with the ball closing component. The seating rings have flange with seals each engaging a side of the corresponding recess. A closing ring is screwed into the cavity to engage the seating rings. The flange of the seating ring defines a working chamber with the recess and the closing ring. The working chamber is communicated with a pressurized medium source and the working chamber is pressurized to displace the seating rings from the ball closing component to allow seal replacement.

19 Claims, 1 Drawing Sheet

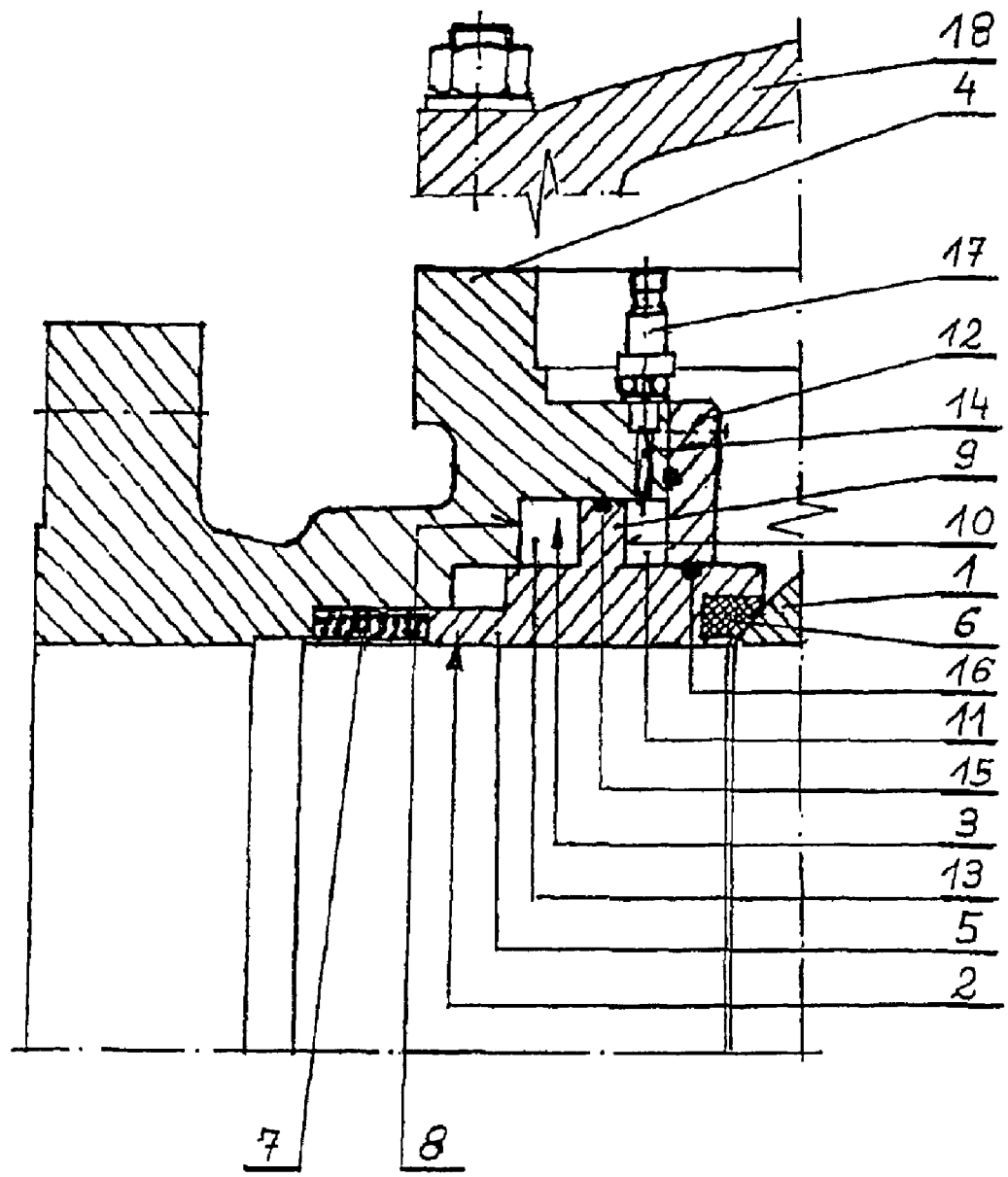

BALL VALVE WITH RETRACTABLE SEALS AND METHOD OF REPLACEMENT THEREOF

BACKGROUND

This invention relates to the way of replacement of main seals in a ball valve and a ball valve.

There are known ball valves with possibility of repairing them in an emergency situations without the necessity of disassembly of valves from a gas piping.

Nowadays, there are widely offered valves with the possibility of replacement of stem seals without the necessity of cutting off or detachment of such a valve from a gas piping but ball valves of a type "Top Entry." e.g., which a construction that enables removing a ball closing component from a body and replacing main seals, e.g. seals of the body, with the ball closing component without disassembly of the valve from a gas piping are still used very rarely.

Previously mentioned valves have a body inside of which there is a ball closing component, seal assemblies located slidably in the recess of the body, and of a stem with seals. The body is closed by a cover. Each of the seal assemblies contains a seating ring, called also a mounting, having a seal placed from a side of the ball closing component.

There is a shaped spring, made of an elastic wire, among the seating ring and seal rings placed in the rear part of a recess which ensures leak tightness at small pressures. Free ends of the spring are bent.

After cutting off a gas supply, degassing of the valve, dismounting of the stem and removing a cover these springs are put forward, which enables shifting of mountings of main seals along a passage axis of the main valve and taking the ball closing component out of the body and then dismounting seating rings in order to replace or repair scales. In the above mentioned case leak tightness at high pressures is ensured first of all by pressure of gas on floating mountings of main seals, as there is a lack of full spring compensation.

The above solution is proportionally simple, but as a result of using two gradual seals there may be problems with leak tightness at indirect pressures, e.g., pressures which are between little and mean pressures and between mean and high pressures.

Moreover a shape of the spring does not ensure equal pressure on the whole circuit.

SUMMARY OF THE INVENTION

A method of of replacement of main seals in a ball valve according to the present invention relies on cutting off gas supply, degassing of the valve, dismounting of a stem, removing a cover from a body, shifting seating rings for a ball closing component along an axis of passage of the main valve, dismounting of the ball closing component, and pushing forward and taking off seating rings in order to replace or repair seals. A working agent in the form of a gas, advantageously compressed air, is delivered to working chambers, formed in recesses of the body at a side of the ball closing component, to shift seating rings along an axis of the passage of the main valve through interaction by pressure of the working agent on a working surface of a flange of each seating ring. The seating rings on either side of the ball closing components are displaced from the ball closing component to allow extraction of the ball closing component. One then equalizes pressure and disassembles closing rings which shield working chambers from the side of the ball closing component before removing seating rings.

The ball valve, according to the invention, is equipped with a ball closing component and with seating rings of seals assemblies placed slidably in recesses of the valve body at either side of the ball closing component to secure the ball closing component. The seating rings contain seals placed on sides of the ball closing component. At a side surface of each seating ring there is a flange, engaging a side surface of the corresponding recess of the body, and having the working surface situated displaced from the ball closing component.

The body recess space contains two chambers. A first chamber is a working chamber situated from the side of the ball closing component between the working surface of the flange of a seating ring and a closing ring which is connected separably with and inner part of the body. A second chamber situated at a back side of the recess. The working chamber is connected by a passage way with interior of the valve body.

In the flange of the seating ring a side, engaging the side surface of the recess, has a seal ring mounted therein.

In the closing ring, shielding the working chamber, a seal ring, situated at the side of the seating ring, is mounted.

The solution, according to the invention, enables in case of an emergency damage of a main seal, suitable survey and repair of a hall valve without necessity of disassembly of the valve from a gas pipe, which brings costs savings connected with cutting off the valve from a gas pipe and shortens the time of shut down of a gas pipe.

Moreover, the invention enables for assembly of ball valves in factory conditions, without the necessity of using specific tools; it is not necessary to use special distance segment rings. This makes both the process of assembly easier and it shortens the time of its realization.

BRIEF DESCRIPTION OF THE DRAWING

The drawing shows an embodiment of the invention in a fragment view of a ball valve in in cross section with a main seal situated at one side of a ball closing component.

DETAILED DESCRIPTION

A method of replacement of main seals in a ball valve according to the invention relies on cutting off gas supply and degassing of the valve.

Having done these basic things connected with industrial safety, next one dismounts a stem, and unscrews and removes a cover 18 from a body 4.

Then one connects a compressed air system supply to connecting end 17 and to working, chambers 11 made in recesses 3 of a body 4 and delivers compressed air from outside. As the result of influence of pressure of compressed air on working surfaces 10 of flanges 9 one moves seating rings 5 along a passage axis of the main valve apart from a ball closing component 1.

Then one removes the ball closing component 1 from the body and, having equalized pressures and having disassembled closing rings 12 shielding working chambers 11, one puts forward and takes away setting rings 5 from the interior of the body 4 in order to repair or replace seals 6.

A ball valve, which enables above mentioned replacement of main seals is equipped with the ball closing component 1 and seal assemblies 2 placed slidably in recesses 3 of a body 4 at both Sides of a ball closing component 1.

Each seal assembly 2 is built of a seating ring 5, containing, at a side of the ball closing component 1, the seal 6 and a pack of compensating springs 7 placed inside the end of the seating ring 5, from the side of the back wall 8 of the recess 3.

On the side surface of the seating ring 5 there is a flange 9, adhering to the lateral surface of a recess 3, having the working surface 10 placed from the side of a ball closing component 1. The space of the recess 3 contains the working chamber 11 at the side of the ball closing component 1 between the working surface 10 of the flange 9 and a closing ring 12 and a chamber 13 at a back side of the wall 8 of the recess 3. The closing ring 12 is screwed down into the inner part of the body 4. The working chamber 11 is connected to an interior of the body 4 through a passage hole 14.

In the flange 9 of the seating ring 5, from the side of sealing to the lateral surface of the recess 3 of the body 4, the seal ring 15, of the type "O" is placed. A seal ring 16 of the type "O" is placed in the closing ring 12 from the side of the seating ring 5. In the end of the passage hole 14, from the side of the interior of the body 4, connecting 17 is screwed down. The connecting end 17 is preferably a fast nipple enabling connection to the compressed air installation.

The cover 18, in which the stem, not shown on the drawing, is mounted, is screwed down to the body 4.

What is claimed is:

1. A method of a ball valve seal replacement in a gas supply system comprising the steps of:
    providing a ball valve in a gas supply system comprising:
        a ball component;
        a valve body defining flow passage and an interior cavity having an access opening that is independent of said flow passage and communicating with said flow passage, said access opening accepting passage of said ball component to permit installment of said half component in said flow passage to regulate flow;
        said valve body defining seating ring recesses in said flow passages at both sides of said ball component;
        seating rings slidably disposed in said seating ring recesses to engage said ball component to effect sealing between said flow passage and said ball component;
        said seating rings including seals for effecting said sealing between said flow passage and said ball component;
        closing rings engaging said scaling ring recesses to retain said seating rings;
        said seating rings having flanges engaging said seating ring recesses and defining working chambers in conjunction with said seating ring recesses and said closing rings;
        passages providing exterior communication with said working chambers; and
        a biasing device biasing said seating rings into engagement with said ball component;
    cutting off gas supply to the valve;
    degassing the valve;
    applying a pressurized medium to said working chambers via said passages to disengage said seating rings from said ball component permitting removal of the ball component;
    removing the ball component from the interior cavity through said access opening;
    removing said closing rings from said seating ring recesses and said interior cavity through said access opening;
    removing said seating rings from said seating ring recesses and said interior cavity through said access opening; and
    replacing said seals on said setting rings.

2. The method of claim 1 wherein said seating rings have flanges with seals engaging said seating ring recesses effecting sealing of said working chambers and said flanges define said working chambers in conjunction with said seating ring recesses and said closing rings.

3. The method of claim 2 wherein said seating rings include seals engaging said closing rings effecting sealing of said working chambers.

4. The method of claim 3 wherein said closing rings have seals effecting sealing with said valve body about said seating ring recesses.

5. The method of claim 1 wherein said seating rings include seals engaging said closing rings effecting sealing of said working chambers.

6. The method of claim 5 wherein said closing rings have seals effecting sealing with said valve body about said seating ring recesses.

7. The method of claim 6 wherein said ball valve further comprises a biasing device biasing said seating rings into engagement with said ball component.

8. The method of claim 1 wherein said closing rings have seals effecting sealing with said valve body and said seating ring recesses.

9. A ball valve comprising:
    a ball component;
    a valve body defining a flow passage and an interior cavity having access opening that is independent of said flow passage and communicating with said flow passage, said access opening accepting passage of said ball component to permit installment of said ball component in said flow passage to regulate flow;
    said valve body defining seating ring recesses in said flow passages at both sides of said ball component;
    seating rings slidably disposed in said seating ring recesses to engage said ball component to effect sealing between said flow passage and said ball component;
    said seating rings including seals for effecting said sealing between said flow passage and said ball component;
    closing rings engaging said sealing ring recesses to retain said sealing rings;
    said seating rings having flanges engaging said seating ring recesses and defining working chambers in conjunction with said seating ring recesses and said closing rings;
    said valve body defining passages providing exterior communication with said working chambers for accepting a pressurized medium to displace said seating rings apart from said ball component to permit removal thereof via said access opening; and
    a biasing device biasing said seating rings into engagement with said ball component.

10. The ball valve of claim 9 wherein said seating rings have flanges with seals engaging said seating ring recesses effecting sealing of said working chambers and said flanges define said working chambers in conjunction with said seating ring recesses and said closing rings.

11. The ball valve of claim 10 wherein said seating rings include seals engaging said closing rings effecting sealing of said working chambers.

12. The ball valve of claim 11 wherein said closing rings have seals effecting sealing with said valve body about said seating ring recesses.

13. The ball valve of claim 12 wherein said seating rings include seals engaging said closing rings effecting sealing of said working chambers.

14. The ball valve of claim 9 wherein said seating rings include seals engaging said closing rings effecting sealing of said working chambers.

15. The ball valve of claim 14 wherein said closing rings have seals effecting sealing with said valve body about said seating ring recesses.

16. The ball valve of claim 15 wherein said seating rings include seals engaging said closing rings effecting sealing of said working chambers.

17. The ball valve of claim 9 wherein said closing rings have seals effecting sealing with said valve body about said seating ring recesses.

18. The ball valve of claim 17 wherein said seating rings include seals engaging said closing rings effecting sealing of said working chambers.

19. The ball valve of claim 9 wherein said seating rings include seals engaging said closing rings effecting sealing of said working chambers.

* * * * *